O. F. ENSIGN & A. J. THUNEMAN.
AUTOMATIC LOCKING DEVICE.
APPLICATION FILED SEPT. 19, 1916.
1,212,033.
Patented Jan. 9, 1917.
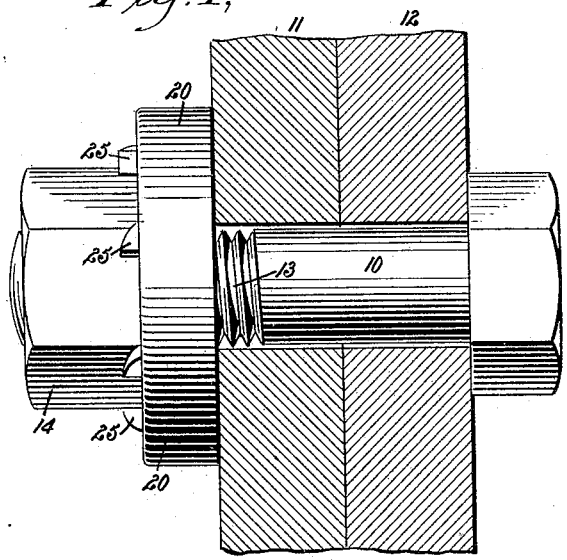
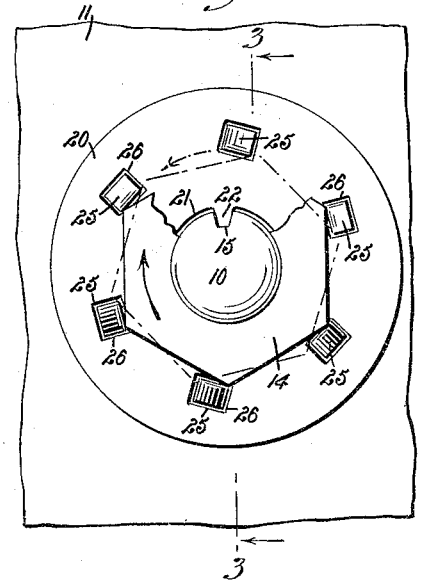
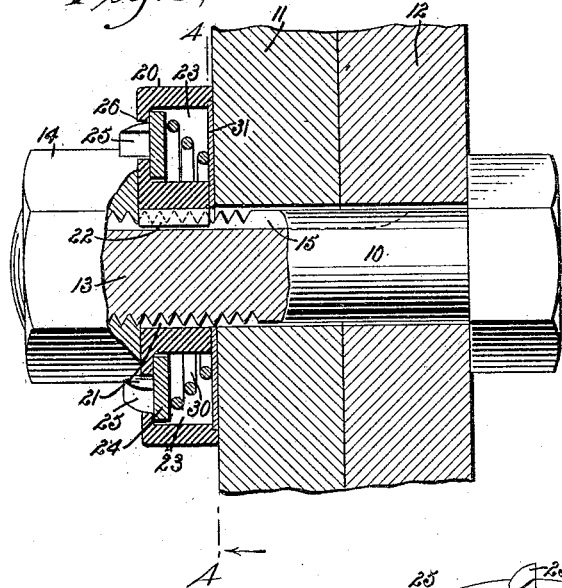
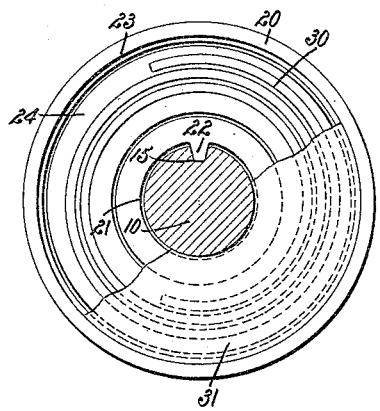
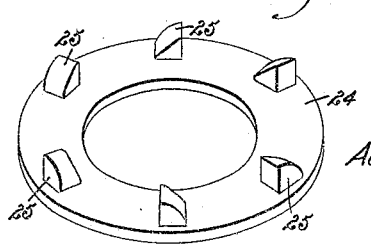
WITNESSES
Edw. Thorpe
INVENTORS
Otis F. Ensign
Alvin J. Thuneman
BY
ATTORNEYS

UNITED STATES PATENT OFFICE.

OTIS FRAZER ENSIGN AND ALBIN JOHN THUNEMAN, OF DEFIANCE, OHIO.

AUTOMATIC LOCKING DEVICE.

1,212,033.   Specification of Letters Patent.   Patented Jan. 9, 1917.

Application filed September 19, 1916. Serial No. 120,953.

*To all whom it may concern:*

Be it known that we, OTIS FRAZER ENSIGN and ALBIN JOHN THUNEMAN, both citizens of the United States, and residents of Defiance, in the county of Defiance and State of Ohio, have invented a new and Improved Automatic Locking Device, of which the following is a full, clear, and exact description.

The invention relates to nut locks, and its object is to provide a new and improved locking device arranged to automatically and effectively lock a screwed up nut in place on a bolt and to allow unscrewing of the nut in case it is desired to do so.

In order to accomplish the desired result, use is made of a recessed washer provided with apertures arranged in a circle and leading into the recess, and a locking ring yieldingly mounted in the said recess and having ratchet teeth extending through the said apertures and projecting on the face of the washer to engage the sides of the nut screwed on the bolt.

A practical embodiment of the invention is represented in the accompanying drawings forming a part of this specification, in which similar characters of reference indicate corresponding parts in all the views.

Figure 1 is a side elevation of the automatic locking device as applied to a bolt and nut, the bolt engaging parts to be fastened together and the parts being shown in section; Fig. 2 is a face view of the same with part of the nut broken out; Fig. 3 is a sectional side elevation of the same on the line 3—3 of Fig. 2; Fig. 4 is a rear sectional face view of the same on the line 4—4 of Fig. 3; and Fig. 5 is a perspective view of the locking ring and its teeth.

The bolt 10 for fastening the parts 11 and 12 together is provided with a thread 13 on which screws the nut 14 and the said bolt 10 is provided with a longitudinally extending groove 15, as plainly indicated in the drawings. The washer 20 is provided with a central opening 21 through which extends the threaded end 13 of the bolt 10, and a key 22 is formed or secured on the wall of the opening 21 and engages the groove 15 to hold the washer 20 against turning on the bolt 10. The washer 20 is provided in its face with a washer recess 23 in which extends a locking ring 24 provided on its face with teeth 25, preferably of ratchet shape, and extending through apertures 26 formed in the face of the washer 20 and leading into the recess 23. The teeth 25 are arranged in a circle, the center of which coincides with the center of the bolt 10, and the said teeth 25 are adapted to engage the sides of the nut 14 to hold the latter against unscrewing on the threaded end 13 of the bolt 10. The back of the locking ring 24 is pressed on by the forward end of a coil spring 30 held in the recess 23 and bearing with its rear end on a thin washer 31 held flush in the back of the washer 20 so as to rest against the face of the part 11, as plainly shown in Fig. 3. It will be noticed that by this arrangement the locking ring 24 is yieldingly mounted in the recess 23.

In using the locking device, the washer 20 with the locking ring 24, spring 30 and washer 31 held in position therein is placed on the threaded end 13 of the bolt 10 with the key 22 engaging the groove 15. The nut 14 is now screwed up against the face of the washer 20. The teeth 25 are so arranged relatively to the nut 14 that when the latter is screwed up its corners readily pass over the beveled backs of the teeth 25 to cause the teeth to move inward until a corner is passed and then to return to outermost position for engagement with the corresponding side of the nut 14. In case a hexagon nut is used, as shown in the drawings for instance, six teeth 25 are used on the locking ring 24 and spaced equal distances apart for engagement with the six sides of the nut 14. For square nuts only four teeth may be used on the locking ring 24, and hence we do not limit ourselves to the number of teeth arranged on the locking ring 24. When it is desired to unscrew the nut 14 the teeth 25 are pressed inward by hand or by the use of a suitable tool to move out of engagement with the nut and thus allow unscrewing of the latter.

Having thus described our invention, we claim as new and desire to secure by Letters Patent:—

1. An automatic locking device for locking nuts on bolts, comprising a washer having a central opening for the passage of a bolt and having a series of apertures arranged in a circle, the center of which coincides with the center of the said opening, the said washer having at its back an annular recess into which open the said apertures, and a locking ring yieldingly mounted in the said recess and having teeth extending through the said apertures and projecting on the face of the washer to engage the sides of a nut screwed on the said bolt.

2. An automatic locking device for locking nuts on bolts, comprising a washer having a central opening for the passage of a bolt and having a series of apertures arranged in a circle, the center of which coincides with the center of the said opening, the said washer having at its back an annular recess into which open the said apertures, a locking ring loose in the said recess and provided with ratchet teeth projecting through the said apertures and adapted to engage the sides of a nut screwing on the bolt, a coil spring in the said recess and bearing with one end against the back of the said locking ring, and means on the back of the washer for the other end of the spring to rest on.

3. In a nut lock, the combination of a bolt having a groove, a nut screwing on the bolt, a washer engaging the bolt in the rear of the nut and having a key fitting the said groove to hold the washer from turning on the bolt, the said washer having an annular recess in its back and having in its face a series of apertures leading to the said recess, the said apertures being arranged in a circle, a locking ring in the said recess and having ratchet teeth extending through the said apertures and engaging the sides of the said nut, and a spring held in the said recess and engaging the said locking ring.

4. In a nut lock, the combination of a bolt having a groove, a nut screwing on the bolt, a washer engaging the bolt in the rear of the nut and having a key fitting the said groove to hold the washer from turning on the bolt, the said washer having an annular recess in its back and having in its face a series of apertures leading to the said recess, the said apertures being arranged in a circle, a locking ring in the said recess and having ratchet teeth extending through the said apertures and engaging the sides of the said nut, a spring held in the said recess and engaging the said locking ring, and a second washer seated in the back of the first-named washer and against which rests the rear end of the said opening.

OTIS FRAZER ENSIGN.
ALBIN JOHN THUNEMAN.